M. C. J. ELISÉE DE LOISY.
PROCESS AND PLANT FOR INDUSTRIALLY CARRYING OUT CHEMICAL REACTIONS IN AN ARTIFICIAL ATMOSPHERE.
APPLICATION FILED JUNE 26, 1919.
1,366,720.
Patented Jan. 25, 1921.
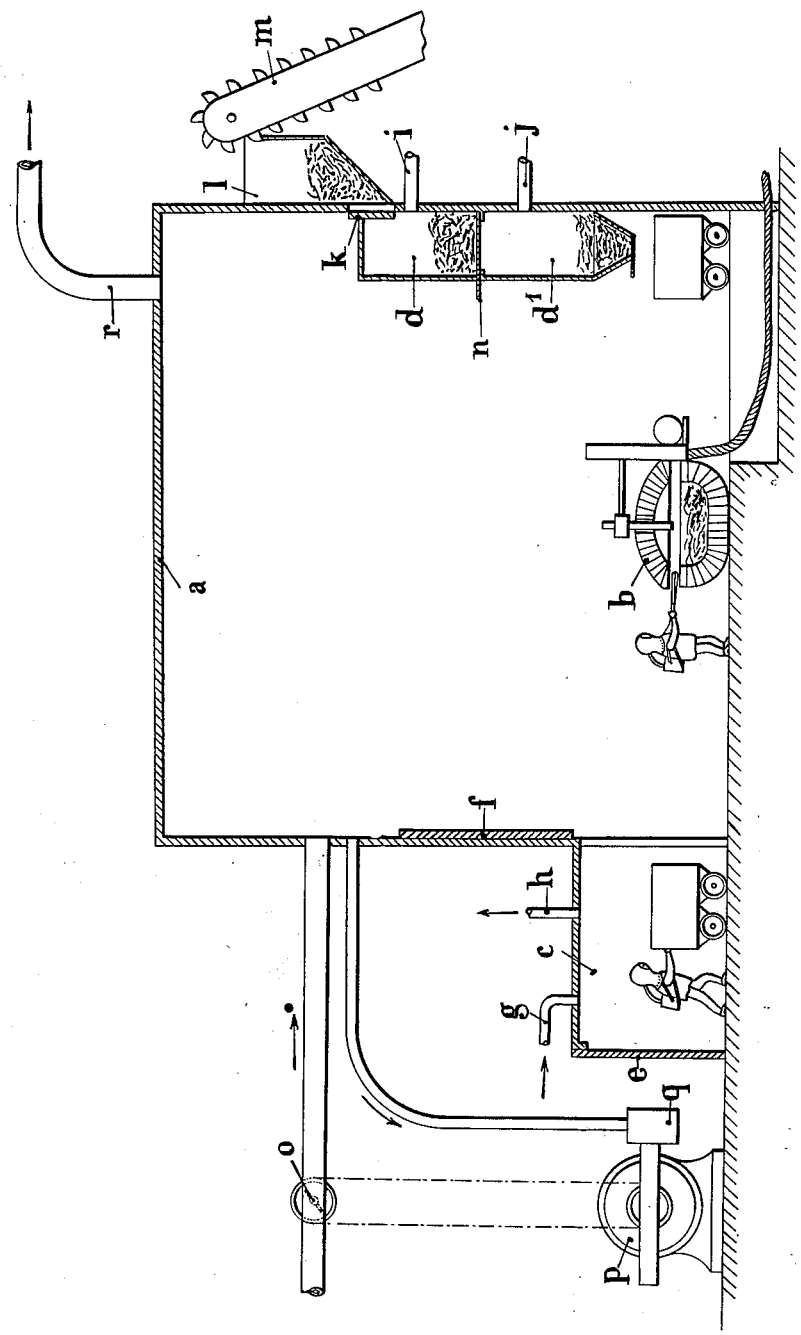

UNITED STATES PATENT OFFICE.

MARIE CHARLES JOSEPH ELISÉE DE LOISY, OF PARIS, FRANCE.

PROCESS AND PLANT FOR INDUSTRIALLY CARRYING OUT CHEMICAL REACTIONS IN AN ARTIFICIAL ATMOSPHERE.

1,366,720.      Specification of Letters Patent.      Patented Jan. 25, 1921.

Application filed June 26, 1919. Serial No. 306,920.

*To all whom it may concern:*

Be it known that I, MARIE CHARLES JOSEPH ELISÉE DE LOISY, of 64 Rue La Boétie, Paris, France, engineer, have invented Processes and Plants for Industrially Carrying Out Chemical Reactions in an Artificial Atmosphere, of which the following is a full, clear, and exact description.

The preparation of certain chemical compounds requires an artificial atmosphere, free for instance from oxygen.

On the other hand, if in the formation of the compound considered certain gases intervene not as neutral agents but as active elements, it is still necessary in this case to operate in an atmosphere containing these gases.

The artificial atmosphere in these two distinct cases is difficult to obtain and maintain, particularly when a high temperature is necessary for the reaction.

The refractory walls of the furnaces, either by reason of their porous nature, or through the joints of the elements composing them, always allow gases to pass; it is possible to remedy this defect by externally covering these walls with a metal casing, but the latter must be provided with openings to permit such operations as charging, discharge, inspection, and stirring, resulting either in loss of the gas to be maintained in the furnace or in the untimely introduction of gases from the atmosphere which are injurious to the reaction desired.

The invention forming the subject-matter of this invention has for its object to obviate all the above mentioned inconveniences and to simplify the construction of the apparatus employed.

This invention consists, substantially, instead of introducing the gas necessary for the desired reaction into a closed furnace, in operating in an open furnace in that gas, that is to say in a furnace communicating freely with an artificial atmosphere maintained in a suitable closed capacity such as a closed room.

The operators in order to accomplish their work in this artificial atmosphere must be provided with suitable respiration apparatus, similar to those used in the mines.

Under these conditions, the apparatus in which the chemical reaction is to be effected may be provided with as many doors and openings as are necessary without having to hermetically close them. Moreover, the re-actionary mass can be stirred up through one of the doors which is left open. Consequently, the work is rendered easier, it can be effected in a perfect manner and the material treated can be easily inspected at any time during the operation.

When using an electric arc furnace, it is not necessary with the present invention to have a gas-tight joint at the point where the electrodes enter the furnace, which joint is usually difficult to obtain by reason of the fact that the electrodes must be progressively moved forward in proportion to their wear.

The present process may receive various industrial applications; it may be particularly used for the manufacture of aluminium nitrid.

It has not been possible heretofore to manufacture on a commercial scale this chemical compound, which is a matter of considerable importance, owing to difficulties arising in the fixation of the nitrogen. In order to obtain aluminium nitrid, it is necessary to maintain at a very high temperature a mixture of bauxite and carbon in presence of nitrogen; now, with the existing processes, which necessitate perfectly gas-tight furnaces, the use of arc furnaces has had to be abandoned by reason of the impossibility of obtaining completely gas-tight joints at the points where the electrodes enter the furnace; the use of resistance furnaces has been tried, but had also to be relinquished by reason of the serious inconveniences they presented.

On the contrary, by means of the process according to this invention, the manufacture of aluminium nitrid no longer presents the above difficulties, since it enables one arc furnace to be used and without fear of any introduction of gases prejudicial to the reaction desired.

This process is industrially carried out by means of the plant shown in the accompanying drawing comprising:

(*a*)—A gas-tight chamber *a*, in which is arranged the apparatus in which the reaction is to be effected in an artificial atmosphere; in the case in which the reaction is to be carried out at a high temperature, the apparatus in which this reaction is effected will consist in any electric furnace $b$ suitable for the operation, such as an arc furnace, a resistance furnace, an induction furnace, or the like. The electric heating gives the advantage of not modifying the desired composition of the atmosphere.

(b)—Chambers $c$, $d$, $d'$ about the openings in the chamber $a$, through which the operators, provided with respiration apparatus, can pass and through which are introduced the materials to be treated. Preferably, the atmosphere of these chambers will be constituted by the gas which is to create the artificial atmosphere in which the reaction must be effected, in order to avoid all risks of the introduction of air from the exterior into the artificial atmosphere of the chamber $a$.

The chamber $c$ through which the workmen are admitted is provided with a gas-tight door $e$ and communication between chamber $c$ and the workroom $a$ may be closed by means of another gas-tight door $f$. The gas desired for the reaction is introduced into the chamber $c$ by means of a pipe $g$ communicating therewith, and it is exhausted through a pipe $h$.

In the chambers $d$, $d'$ through which the materials to be treated are introduced, a vacuum may be created if required in order to free such materials from the air or from the gases which may be brought in thereby.

To this end these chambers $d$, $d'$ communicate with pipes $i$ and $j$ through which the gas may be introduced, or a vacuum applied.

The upper chamber $d$ is connected by means of a door $k$ with an outer hopper $l$ to which the material to be treated is fed by a conveyer $m$.

The upper and lower chambers may be connected by means of a door $n$.

(c)—Apparatus, preferably automatic and controlled by a regulator, adapted to maintain constant the artificial atmosphere of the workroom $a$; this apparatus is arranged in such a manner as to inject into the latter the gas forming this artificial atmosphere in proportion to its absorption in the course of the reaction; this artificial atmosphere may be also renewed in a continuous manner in order to free it from extraneous gases evolved during the operation or to maintain the said gases therein in a predetermined proportion.

This automatic apparatus may comprise a valve $o$ controlled by an electric motor $p$ which is actuated in the proper direction by the regulator $q$ on which acts the pressure of the gas contained in the workroom $a$.

Should the pressure in the workroom $a$ become excessive, the gas would escape through a valve-controlled pipe $r$.

Claims:

1. A process for industrially carrying out chemical reactions in an artificial atmosphere, which consists in operating in an open furnace, in communication with a closed chamber containing the gas which is to create this artificial atmosphere.

2. A process for industrially carrying out chemical reactions in an artificial atmosphere, which consists in operating in an open furnace, arranged in a completely closed room containing the gas which is to create this artificial atmosphere.

3. The application of the present process to the industrial manufacture of aluminium nitrid, characterized by the fact that a mixture of bauxite and carbon is caused to react in an electric furnace, communicating freely with a completely closed room in which is maintained an atmosphere of nitrogen.

4. A plant for carrying out the present process comprising a workroom hermetically closed, in which is created an artificial atmosphere constituted by the gas which is to intervene in the reaction, an apparatus in which the reaction is to be effected, this apparatus being arranged within the said room and communicating freely with the atmosphere of the latter, means for maintaining constant the artificial atmosphere of this workroom, chambers applied to the openings of the said room, through which enter the operators provided with respiration masks or apparatus and through which are introduced the materials to be treated.

The foregoing specification of my process and plant for industrially carrying out chemical reactions in an artificial atmosphere, signed by me, this 10th day of June, 1919.

MARIE CHARLES JOSEPH ELISÉE de LOISY.